(12) United States Patent
Löffler et al.

(10) Patent No.: US 6,299,921 B1
(45) Date of Patent: Oct. 9, 2001

(54) COOKING DEVICE AND A METHOD FOR INDIVIDUALLY GUIDING A COOKING PROCESS

(75) Inventors: Erhard Löffler, Türkheim; Peter Kohlstrung, Kaufering; Thomas Schweinfest-Feile, Puchheim, all of (DE)

(73) Assignee: Rational AG, Landsberg/Lech (DE)

( * ) Notice: Subject to any disclaimer, the term of this patent is extended or adjusted under 35 U.S.C. 154(b) by 0 days.

(21) Appl. No.: 09/403,963

(22) PCT Filed: Apr. 30, 1998

(86) PCT No.: PCT/DE98/01257

§ 371 Date: Jan. 11, 2000

§ 102(e) Date: Jan. 11, 2000

(87) PCT Pub. No.: WO98/48679

PCT Pub. Date: Nov. 5, 1998

(30) Foreign Application Priority Data

Apr. 30, 1997 (DE) ............................................. 197 18 399

(51) Int. Cl.[7] ................... A21B 1/00; A23L 1/00
(52) U.S. Cl. .............. 426/233; 99/326; 99/332; 99/335; 426/523

(58) Field of Search ................................. 426/231, 233, 426/523; 99/326, 327, 331, 332, 335

(56) References Cited

U.S. PATENT DOCUMENTS

| 4,281,022 | 7/1981 | Buck ..................................... 426/233 |
| 5,215,000 | * 6/1993 | Desage et al. ......................... 99/331 |

FOREIGN PATENT DOCUMENTS

| 0 550 312 | 7/1993 | (EP) . |
| 0 701 387 | 9/1994 | (EP) . |
| 2 203 320 | 10/1988 | (GB) . |

* cited by examiner

Primary Examiner—George C. Yeung
(74) Attorney, Agent, or Firm—Schiff Hardin & Waite

(57) ABSTRACT

A method for cooking in a cooking device which has a cooking chamber and a measuring device to detect variables pertaining to a given state of food which is being cooked. The variables vary according to the cooking process. The cooking process is carried out according to at least one measured value corresponding to a cooking state variable. The cooking process is also carried out according to one of several values corresponding to a derivative of a cooking state variable obtained as a function of a duration of the cooking process.

14 Claims, 2 Drawing Sheets

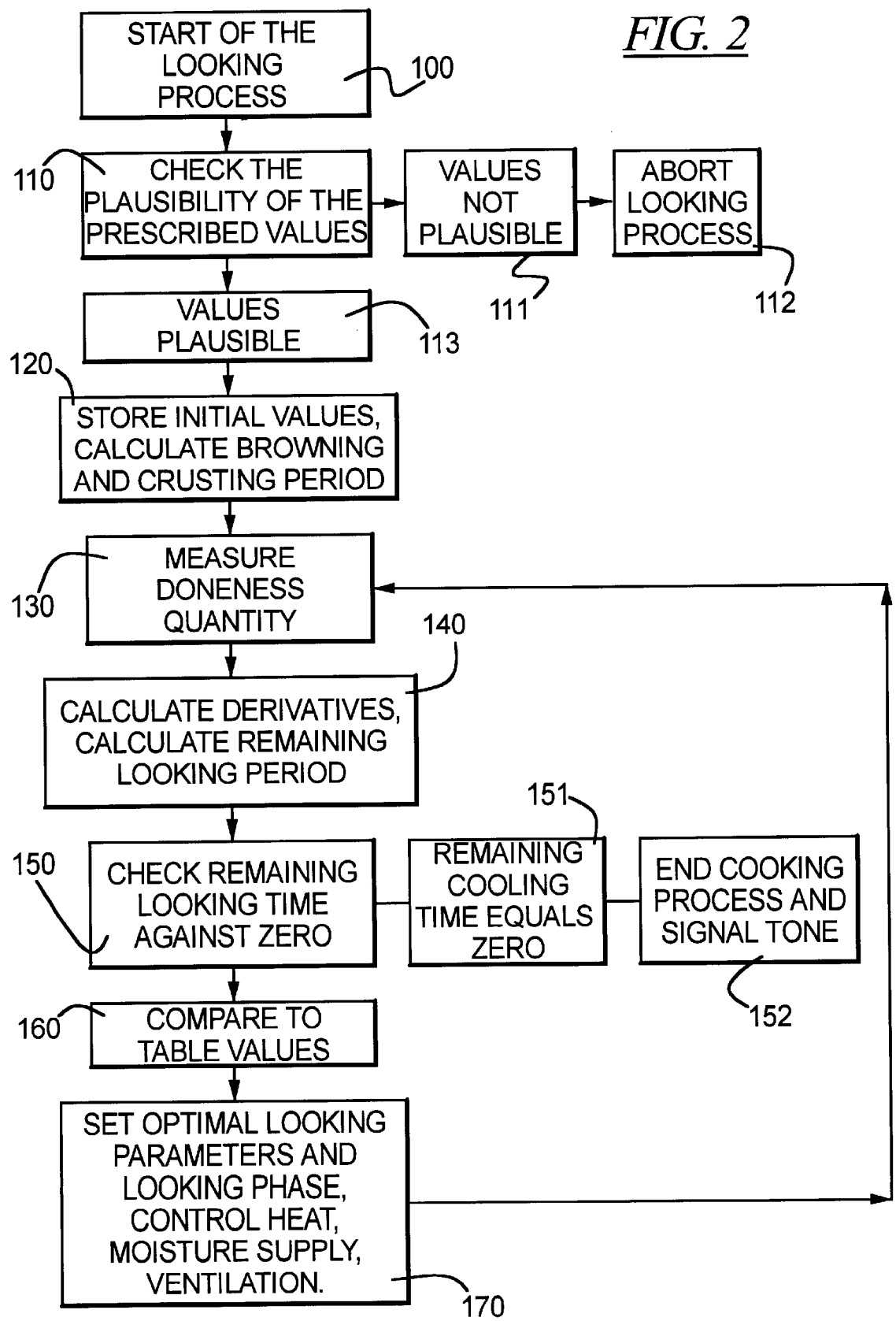

COOKING DEVICE AND A METHOD FOR INDIVIDUALLY GUIDING A COOKING PROCESS

BACKGROUND OF THE INVENTION

The invention relates to a method for cooking in a cooking device with a cooking space and a measuring device for registering values of at least one doneness quantity relating to a characteristic of the cooking product, the value of which changes on the basis of the cooking process, whereby the instant of the end of the cooking process is extrapolated at various instants during the cooking process upon consulting the respective measurement value last registered and a predetermined end value at the end of the cooking process. It also relates to a cooking device in which such a method is implemented.

There are known devices in which a core temperature sensor can be inserted into a piece of meat, and the cooking process is ended when the core temperature reaches a predetermined value. It can be provided there that different phases of the preparation process are initiated when the core temperature reaches additional predetermined values during the cooking process.

However, these cooking devices enable an optimal cooking process only under very specific conditions with respect to the type, amount and size of the cooking product.

Given a controlling of the cooking process with the aid of the core temperature, an optimal initiating of the browning and crusting phase for pieces of meat of different thicknesses or sizes is not possible, since the value of the core temperature at which the crusting phase must be initiated is different for pieces of meat of different thicknesses.

The time at which a browning or crusting phase must be initiated likewise varies with the thickness and size of a piece of meat, so that, given a pure time control of the cooking process, in which the browning or crusting phase is initiated at a fixed time after the start of the cooking process, when the meat thickness varies, these phases begin too soon or too late, and the piece of meat is browned too little or too much accordingly. The time at which a browning or crusting phase must be initiated also depends on the amount of the cooking product in the cooking space.

There are also known cooking devices in which the user can input the type and amount of a cooking product that is to be prepared and which then specify the required cooking time and the time characteristic of actuating or regulating variables of the cooking device, such as the temperature or the moisture in the cooking space or the microwave power.

With the aid of additional input parameters which are relevant to the time of initiation of various preparation phases, such as the thickness or size of a piece of meat, it would be possible in these devices to achieve a guidance of the cooking process that is more sharply tailored to the specific characteristics of the individual cooking product. But this would require additional measuring and/or weighing processes by the user before starting the cooking device and would lead to an appreciable increasing of the volume of data which the computer unit of the cooking device must store and manage in order to be able to make available the optimal cooking process for the respective conditions.

The reference GB 2 203 320 A teaches a species-related method by which a core temperature is measured and then compared to a control point, in order to predict the instant at which the coking product is done.

EP 0 701 387 A2 discloses a cooking method according to which the doneness of a cooking product is evaluated without identifying it, via moisture measurements, particularly for purposes of determining the end time of the cooking process.

U.S. Pat. No. 4,281,022 teaches a method for cooking thin meat in a microwave oven in which the core temperature is determined via the moisture and the temperature in the cooking space, in order to then be able to compute the doneness.

SUMMARY OF THE INVENTION

It is an object of the invention to propose a method for guiding a cooking process which intrinsically takes into account changes of the volume or the size of the cooking or food product. It is also intended to make available an appertaining cooking device.

The object relating to the method is inventively achieved by a method of registering values of at least one doneness quantity relating to a characteristic of the cooking product which values change on the basis of the cooking process and extrapolating the time of the end of the cooking process at varying times during the process by applying the respective last registered measurement value and a prescribed first value of doneness quantity at the end of the cooking process. The improvement comprises guiding the course of the cooking process on the one or more values of a time derivative of the doneness quantity from the measured values of the doneness quantity and defining during the cooking process at least one value of a setting point of the cooking device which influences the cooking process so as to depend on the time derivative of the doneness quantity during the cooking process.

The course of the cooking process, which depends on at least one measured value of the doneness quantity, is guided depending on one or more values of a time derivative of a doneness quantity, particularly of the core temperature, during the cooking process. The steps in the guiding of the process are defined clearly with the aid of prescribed criteria, which it is possible to implement by the software of the device and corresponding input parameters. To guide the cooking process, it is also provided that at least one value of a manipulated variable of the cooking device is defined during the cooking process depending on a time derivative of a doneness variable during the cooking process. Such manipulated variables can be control or regulating quantities such as the temperature or the moisture in the cooking space. What is essential to the invention is the determining of the time of the end of the cooking process based on values of at least one doneness variable that were computed during the cooking process at different times and of a predetermined final value of the doneness variable. Here, the time period is extrapolated until the attaining of a final condition, as defined by said final value, which can be predicted based on the previous cooking process. Actions in the guiding of the cooking process can be chronologically related to the end of the cooking process, unlike in the traditional time control, which refers to the beginning of the cooking process. In particular, individual preparation phases can be so tuned to the end of the cooking process that a "spot landing" is achieved, in which all the desired characteristics of the finished cooking product, such as browning, doneness in the core of a piece of meat, and so on, are achieved at the same time.

The time and scope of a specific action during the cooking process, for instance the act of switching over to another mode of operation or of setting an actuating variable to a specific value, inventively depend at least not exclusively on the respective instantaneous value of a doneness variable, but in particular on the preceding time behavior of this doneness variable, which can be characterized mathematically by stating the value of one or more time derivatives. According to a preferred embodiment of the invention, it is provided that the first time derivative of a doneness variable is applied for purposes of guiding the cooking process, or respectively, according to another development, the first and second derivatives of this variable time are applied. These derivatives can be calculated by computation on the basis of measurement values which are registered at various times, whereby an explicit computation of one of these derivatives is not necessarily required, as long as the result of the processing process is functionally dependent on the actual given value of the derivative of a doneness quantity. The term "derivative" should not be understood in the strictly mathematical sense, but as also encompassing approximations of derivatives, potentially by means of the appertaining differential quotients.

In particular, it can be inventively provided that during the cooking process at least one value or a time sequence of values of a setting point of the cooking device is determined depending on the value of a doneness quantity last calculated and on the appertaining value of its first time derivative. Instead of the current value of the doneness quantity, besides said derivative, it is also possible to use the time since the beginning of the cooking process as the second parameter for determining the value or values of the setting point.

The setting point can thus be prescribed at a fixed value, potentially until a respecification based on registered measurement values, or one of several control programs can be started, which regulate or control the value of the setting points corresponding to a predetermined time characteristic for a predetermined period of time, potentially until the end of the cooking process, whereby the value that is set, or respectively, the program that is selected depends on both the respective measurement value of a doneness quantity and/or on the time since the beginning of the cooking process as well as on said first derivative.

One or more values of setting points can be determined depending on a time period over which the first derivative of a doneness time quantity equals zero, for instance the dead time of the core temperature at the beginning of a cooking process.

The temperature and/or the moisture in the cooking space can be the setting points of the cooking device, whose value is determined depending on a time derivative of a doneness quantity.

A preferred variant of the inventive method consists in the calculating of the time of the end of the cooking process based on the last obtained value of a doneness quantity, the appertaining values of its first and second time derivatives, and a predetermined final value of the doneness quantity at the end of the cooking process, for which common mathematical extrapolation methods are available. It is possible to achieve a precision in the minute range in this way.

According to another embodiment, it is provided that the time of the end of the cooking process is calculated at different times using the respective last registered measurement value, it being possible to use the respective last calculated value for the end of the cooking process for further action. The prognosis for the end of the cooking process is thus updated and the precision of the prognosis and thus of the process guidance is improved.

The invention can provide that, from a time with a predetermined time interval from the calculated end of the cooking process, one or more setting points of the cooking device are set at a value that was specified in advance or corresponding to a specified time sequence of values.

For example, the length of the crusting and browning processes can be determined, with the aid of known crusting and browning tables, based on an inputted desired cooking temperature and potentially on a desired degree of moisture which should be present at the end of the cooking process. A conventional crusting and browning process is then begun based on the values that are obtained from the corresponding tables at a time interval from the estimated end of the cooking process which corresponds to the optimal browning and crusting period. It is thus possible to achieve a desired degree of doneness in the interior of a piece of meat (well done, medium, etc.) given simultaneous optimal browning and crusting on the outside, without preliminary weighing or measuring.

In particular, the core temperature of the cooking product can be a doneness quantity, a value of a setting point being determined depending on the time characteristic thereof. Other possible doneness quantities which it is possible to use to guide the cooking process are the browning of the cooking product or the moisture in its interior, for example.

The invention can provide a change of the mode of operation of the cooking device, for instance an activation or deactivation of the moisture regulating, a transition from a microwave operation to a hot-air operation, and so on, at a time that depends on one or more values of a derivative of a doneness quantity.

In addition, the invention is directed to a cooking device having a cooking space, at least one measurement sensor for registering values of at least one doneness quantity relating to a characteristic of the cooking product, the value of the quantity changing based on the cooking process and with a storage unit and a control means for purposes of automatically guiding the cooking process, which means receives the output of the measurement sensor as an input signal and which accesses the storage unit in the determination of desired values for the setting point. The improvements are that the control means is arranged to guide the cooking process according to at least one measured value of the doneness quantity and at least one time derivative of the doneness quantity.

Thus, desired values can be stored in the memory, particularly as numeric data, and can be retrievable by stating address data comprising a value for the first derivative of a doneness quantity, so that an accessing of the relevant stored desired value is accomplished upon the inputting of the value of this derivative and potentially of additional address data which may relate to the instantaneous value of the doneness quantity or to the type of cooking product.

The inventive cooking device can be additionally designed for influencing setting points by hand and can comprise a means for storing the values for setting points that are specified by a user or by the control means together with the appertaining measurement values of a doneness quantity and/or one or more of its time derivatives such that the control means can reproduce the sequence of values of the setting points of the earlier processes based on the thus stored data of an earlier cooking process and on the measurement values registered by one or more measurement sensors in a current cooking process. Here, in storing in particular, an allocation of values of the derivative of a doneness quantity to desired values of a setting point of the cooking device can be created as described above.

The invention is based on the recognition that by applying the time characteristic of measured quantities relating to characteristics of the cooking product that change during the cooking process, it is possible to take into account the volume and in particular the thickness of the cooking product in the guidance of the cooking process. For example, the dead time of the core temperature, that is, that time subsequent to the start of the cooking process during which the core temperature changes only slightly or not at all, is directly associated with the thickness of a piece of meat. Likewise, the rate of change of the core temperature at a specific core temperature value or at a specific time after the start of the cooking process depends on the thickness of the piece of meat, so that, for instance, by setting the desired values for the temperature in the cooking space so as to depend on the rate of the change of the core temperature, different thicknesses of the cooking product can be taken into account. Furthermore, by considering the derivatives of doneness quantities, for instance of the core temperature, the time period until the end of the cooking process, which is specified by a final value of the cooking quantity, the required cooking time can be computed with a precision in the minute range, enabling a precise and individual calculation of the remaining cooking time. This makes it possible for preparation phases which are essentially determined by a fixed time period and fixed values of the cooking quantities, such as browning or crusting phases, to be initiated at the optimal time prior to the end of the cooking process.

Additional features and advantages of the invention derive from the detailed description of an exemplifying embodiment with reference to the enclosed drawings.

BRIEF DESCRIPTION OF THE DRAWINGS

FIG. 2 is a flowchart of an embodiment of the inventive method.

DESCRIPTION OF THE PREFERRED EMBODIMENT

Figure 1:
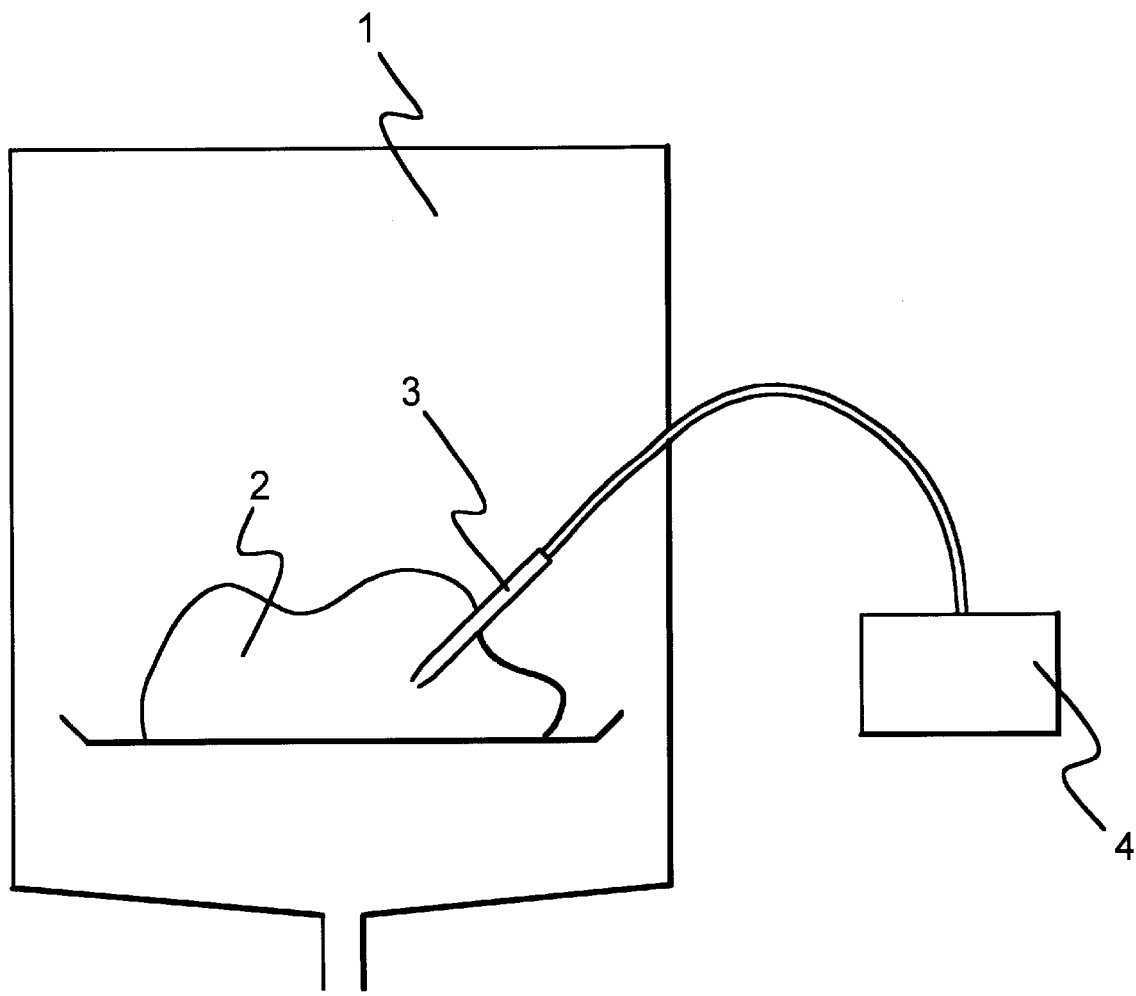
FIG. 1 is a schematic illustration of an inventive cooking device.

FIG. 1 is a heavily schematized illustration of a cooking device with a cooking space 1, in which a food or cooking product 2 has been received. A core temperature sensor 3 has been inserted into the cooking product, which conducts signals to an evaluating means 4.

The cooking device preferably functions as a combined steam/hot-air device in which it is possible to set a homogenous temperature and a homogenous moisture in the cooking space, and it is possible to implement the inventive method for other types of cooking devices as well, for instance for pure hot-air devices, microwave devices or devices with a combination of different principles. The core temperature sensor is preferably a temperature sensor with a plurality of sensing points, and a representative core temperature of the meat is calculated by averaging the different registered values, whereby it is also possible to select the minimal core temperature. It can be additionally provided, with an additional sensor which is either integrated in the measurement sensor 3 or realized in the form of an additional measurement sensor, that a quantity is registered which is directly correlated with the first time derivative of the core temperature. The corresponding signals can then be used by the control unit subsequent to a corresponding calibration by the evaluating unit 4.

The cooking device further comprises a display and operating element via which input parameters can be inputted by the user, it being possible to graphically display the inputted parameters, the selected cooking method and/or the current stage of the cooking process on the display unit.

A data interface is also present, with which it is possible to read data into storage units of the cooking device.

The measurement values for the core temperature are registered at regular time intervals via the measurement sensor 3 and are stored. From the registered measurement values, the evaluation unit 4 approximately determines the first time derivative of the core temperature using a differential quotient $\Delta_1$ according to the formula:

$$\Delta_1 = (T_n - T_{n-1})/\Delta t, \quad (1)$$

whereby $T_n$ is the last registered value of the core temperature, $T_{n-1}$ is the next-to-last registered value of the core temperature, and $\Delta t$ is the time interval between two measurements, whereby the second derivative of the core temperature over time is obtained approximately from the last three registered measurement values using a differential quotient $\Delta_2$ according to the formula:

$$\Delta_2 = (T_n + T_{n-2} - 2T_{n-1})/\Delta t^2 \quad (2)$$

whereby $T_{n-2}$ is the third-to-last registered value of the core temperature. The evaluating unit 4 further extrapolates the time characteristic of the core temperature based on the last registered measurement value, the first time derivative calculated from the two last measurement values, and the second time derivative calculated from the last three measurement values, and with the aid of the thus calculated extrapolation curve, it determines the time point at which a final value for the core temperature that was specified via the inputting means is reached. By incorporating the second time derivative, non-linearities in the time characteristic of the core temperature can be taken into account, and a more precise extrapolation can be achieved than with a purely linear extrapolation. It should be noted here that the extrapolation need not necessarily proceed via the intermediate step of the explicit computation and storing of a differential quotient of first or second order. Rather, the equations (1) and (2) for the (approximate) first and second derivatives can be inserted directly into the extrapolation formula, which then constitutes a function of the registered measurement values, though implicitly it still contains the dependency on the first and second derivatives. This substituted equation can then be used directly for purposes of extrapolating the end of the cooking process, without the intermediate step of the calculation of $\Delta_1$ and $\Delta_2$ according to equations (1) and (2).

The quantities calculated by the evaluating means are delivered to a control means. The control means accesses the stored tables, in which the optimal values of the setting points, here the temperature and the moisture in the cooking space, for different types of cooking product, such as pork, beef, and so on, in different cooking phases are stored as a function of the core temperature and of the first time derivative of the core temperature. The control unit in turn accesses a memory unit in which the length of the browning and crusting phases are specified as a function of the type of the cooking product and the desired values for the temperature and possibly for the moisture in the cooking space at the end of the cooking process, these being inputted via the input means. This storage unit corresponds to a series of tables which allocate a particular length of the crusting, or respectively, browning phase to a specific final temperature and a specific final moisture in the cooking space for each cooking product. These tables are arranged so that the browning behavior will progress slowly up to temperatures of 230° C. and rapidly above this temperature. A strong progressivity serves for achieving a more intensive browning and crusting. According to an alternative embodiment, the degree of moisture at the end of the cooking process is not specified by user input, but is rather put into table form and determined by the system from a corresponding table based on the input values for the type of the cooking product and the final temperature in the cooking space.

An exemplifying sequence of the inventive cooking method is detailed below.

In a preliminary step (not illustrated) the user inputs the type of cooking product and a desired final core temperature. The final temperature in the cooking space and the final moisture value in the cooking space are then inputted, which are needed in order to determine the parameters of the browning and crusting phases. Then in step 100 the cooking process is started.

In step 110, a pretesting of the input values for their plausibility takes place; that is, it is checked whether it is possible to execute a process with the inputted parameters at all. If not (step 111), the cooking process is aborted (112) and there occurs a warning signal and/or a corresponding item of information for the user via the display device of the cooking device.

If the prescribed values are plausible (step 113), then in step 120, starting values for the cooking space parameters, that is, the cooking space temperature and the moisture in the cooking space, are defined and stored as a function of the type of cooking product and of the selected final core temperature. These values are derived from stored tables. The browning and crusting periods are also determined with the aid of the stored tables based on the inputted values for the final temperature in the cooking space and the moisture in the cooking space. The actual cooking process is then initiated with the initial values obtained.

In step 130, when a predetermined period of time has expired, the core temperature in the piece of meat is measured as the doneness quantity. In step 140, the first and second-time derivatives of the core temperature are determined based on the last three measurements of the core temperature in the piece of meat, and from this the remaining cooking time is calculated. In step 150, it is checked whether the remaining cooking time is zero. If so (step 151), the cooking process is ended, and a signal tone is generated informing the user about the end of the cooking process (step 152). If the remaining cooking time is not equal to zero, then a comparison takes place of the instantaneous values for the moisture and temperature in the cooking space to the table values that are stored for the measured Core temperature and for the calculated first derivative of the core temperature, as well as a comparison of the remaining cooking time to the browning and crusting period (step 160). If the remaining cooking time is less than the stored browning and crusting periods that were calculated in step 120, then there is a jump to a browning and crusting process, in which the temperature and moisture in the cooking space are set corresponding to table values in which the browning behavior and the crusting behavior of different types of meat are stored, regardless of the registered core temperature.

If, however, the remaining cooking period is greater than the computed browning and crusting period, then the control means obtains the values of the temperature and moisture that are allocated to the core temperature and to the computed first time derivative of the core temperature from the stored table. If the two input values, that is, the core temperature and its first time derivative, correspond imprecisely to values in the table, an interpolation of the values in the table takes place by a known interpolation method, or respectively, data decompression method. If the instantaneous values for the temperature and the moisture in the cooking space deviate from the values that derive from the stored tables, the cooking temperature and the moisture in the cooking space are adjusted to the optimal values by actuating heat, moisture supply, ventilation, and so on (step 170). The process then returns to step 130, in which a new value for the core temperature in the meat is registered. The loop constituted by the steps 140, 150, 160 and 170 then repeats, until it emerges in step 150 that the remaining cooking time is zero. The time interval between two measurements (step 130) is usually constant. In certain phases of the cooking process, for instance in the beginning phase or in the final phase, different time intervals can be used, potentially in order to receive sufficient data for computing the derivatives in the initial phase optimally quickly or in order to obtain a better precision of the extrapolation.

As mentioned above, at least three measuring points are required in order to calculate the second derivative, which is used on its part to calculate the remaining cooking time. Therefore, in the first three cycles, the steps 140, 150, 160, and 170 are skipped; that is, the system first determines three successive measurement values of the core temperature before the actual controlling is begun. In a modification of this method, during the first three cycles a temporary adjustment of the temperature and the moisture in the cooking space can occur on the basis of one or two existing measurement values of the core temperature.

In the table values, which are stored in the storage unit, for the allocation of temperature and moisture in the cooking space to the core temperature and to the first time derivative of the core temperature, Just as in the tables for calculating the browning and crusting period, knowledge is summarized that has been gained through experience, about cooking processes in which the temperature and the moisture in the cooking space for the different phases were set by the user entirely or partly by hand. These tables can be expanded and updated in that new tabular allocations are read into the storage unit via the data interface of the cooking device, or respectively, old allocations are deleted. It is also possible to store different variants of cooking processes with the same basic parameters, which can be selected with an additional input parameter via the operating unit. Likewise, the time since the beginning of the cooking process can be used as allocation parameter in said tables in place of the core temperature, which parameter codetermines the desired values in the comparison in step 160 of the above described method.

Such cooking programs need not necessarily be prescribed from the outside via an interface; rather, they can also be computed by the device itself in a cooking process that is controlled completely or partly by hand. For this, a storage mode is selected via the display and operating element of the cooking device. In this storage mode, the temperature and moisture in the cooking space, on one hand, and the measured core temperature in the piece of meat and the appertaining first time derivative of the core temperature during a cooking process, which is controlled wholly or partly by hand, are so computed and stored, for instance at regular intervals or in the transition between different preparation phases, that the core temperature and the first time derivative of the core temperature can be used as address parameters for the temperature and the moisture in the cooking space. Accordingly, the manually guided process can be automatically repeated at a later time in that the device respectively allocates the obtained values for the core temperature and the first derivative of the core temperature to addresses of two memory fields, in which the moisture and the temperature of the cooking space are stored that were set in the manually guided process given the corresponding values of the core temperature and its derivative. In this way, it is possible for a user to vary and arrange a cooking process to his own taste despite his taking over predetermined optimized cooking processes.

For the sake of simplicity, the above description of an exemplifying embodiment involves the case where only a single doneness quantity was applied for purposes of influencing the cooking process. However, it is possible according to the invention for different doneness quantities and their derivatives to be used for purposes of influencing the cooking process, as alternatives or at the same time, particularly for determining the desired values for setting points of the cooking device, which it is possible to obtain with the aid of stored tables or to compute based on stored model functions, as described above.

The inventive features disclosed in the preceding specification, in the claims, and in the drawings can be essential, both individually and in arbitrary combination, for realizing of the invention in its various embodiments.

What is claimed is:

1. In a method for cooking a food product in a cooking device comprising a cooking space and a measuring device for registering values of at least one doneness quantity relating to a characteristic of the food product, the value of which doneness quantity changes on the basis of a cooking process, whereby the time of the end of the cooking process is extrapolated at various times during the cooking process by applying the respective last registered measurement values and a prescribed final value of a doneness quantity at the end of the cooking process, the improvements comprising obtaining at least one value of a time derivative, guiding the course of the cooking process on at least one measured value of a doneness quantity and on one or more values of a time derivative of the doneness quantity during the cooking process, and during the cooking process, defining at least one value of a setting point of the cooking device that influences the cooking process so as to depend on a time derivative, during the cooking process, of a doneness quantity.

2. The method according to claim 1, wherein, during the cooking process, a value or a time sequence of values of a setting point of the cooking device is defined depending on the last registered value of a doneness quantity and on the appertaining value of its first time derivative.

3. The method according to claim 1, wherein one or more values of setting points are defined depending on a time period over which the first time derivative of a doneness quantity essentially equals zero.

4. The method according to claim 1, wherein the temperature and/or the moisture in the cooking space is one setting point of the cooking device for which a value is specified depending on a time derivative of a doneness quantity.

5. The method according to claim 1, wherein the time of the end of the cooking process is determined based on the last obtained value of a doneness quantity, on the appertaining values of its first and second time derivatives, and on a prescribed final value of the cooking quantity at the end of the cooking process.

6. The method according to claim 1, wherein from a time with a predetermined time interval from the calculated end of the cooking process, one or more setting points of the cooking device are set to a value that was specified in advance or corresponding to a specified time sequence of values.

7. The method according to claim 1, wherein the core temperature of the food product is a doneness quantity, a value of a setting point of the cooking device being specified depending on the time characteristic of the core temperature.

8. The method according to claim 1, wherein a change of the mode of operation of the device at a time depends on one or more values of a derivative of a doneness quantity.

9. In a cooking device with a cooking space, at least one measurement sensor for registering values of at least one doneness quantity relating to a characteristic of a food product, the value of which quantity changes based on a cooking process, and with a storage unit and a control means for purposes of automatically guiding the cooking process, which receives the output signal of the measurement sensor as an input signal and which accesses the storage unit in the determination of desired values for the setting points, the improvement comprising the control means being arranged to guide the cooking process according to at least one measured value of the doneness quantity and at least one time derivative of a doneness quantity during the cooking process.

10. The cooking device according to claim 9, which includes second means for inputting and storing parameter values relating to the food product and/or the cooking process, whereby the control means applies one or more of these parameter values as input values for guiding the cooking process.

11. The cooking device according to claim 10, wherein the second means receives a final core temperature that is to be attained at the end of the cooking process and/or a temperature in the cooking space at the end of the cooking process.

12. The cooking device according to claim 10, wherein the second means receives a value for the moisture in the cooking space at the end of the cooking process.

13. The cooking device according to claim 9, which includes a storage unit in which an allocation is kept of values of at least one of the time derivatives of a doneness quantity to desired values of setting points of the cooking device.

14. The cooking device according to claim 9, wherein the cooking device is arranged for a manual influencing of setting points and comprises a means for storing the values for setting points that are prescribed by the control means or by the user, together with the appertaining measurement values of a doneness quantity and/or one or more of its time derivatives, so that the control means can reproduce the sequence of values of the setting points of an earlier process based on the stored data of the earlier cooking process and on the measurement values registered by one or more measurement sensors in a current cooking process.

* * * * *